United States Patent [19]
Farnsworth et al.

[11] Patent Number: 5,619,910
[45] Date of Patent: Apr. 15, 1997

[54] LAMINATED GRIDDLE TOP

[75] Inventors: Craig A. Farnsworth, Chagrin Falls; Michael A. Aronov, Beachwood; Jeff J. Verlinden, Parma; Roger D. Sheridan, Wadsworth, all of Ohio; Douglas J. Horton, Lombard; Charles W. Herring, Capron, both of Ill.

[73] Assignee: Keating of Chicago, Inc., Capron, Ill.

[21] Appl. No.: 582,873

[22] Filed: Jan. 4, 1996

[51] Int. Cl.⁶ .............................. A47J 37/10; H05B 3/00
[52] U.S. Cl. .................. 99/422; 99/423; 99/447; 219/436; 219/542
[58] Field of Search ...................... 99/422, 423, 424, 99/425, 447, 349; 126/39 H, 39 N, 39 J, 41 R; 219/236, 542

[56] References Cited

U.S. PATENT DOCUMENTS

| | | | |
|---|---|---|---|
| Re. 32,994 | 7/1989 | Adamson et al. | 99/332 |
| 1,090,924 | 3/1914 | Lawrence | 99/425 |
| 1,690,570 | 11/1928 | Dalbey, Sr. | 99/425 |
| 2,156,557 | 5/1939 | Wilson | 99/425 |
| 2,840,684 | 6/1958 | Watkins, Jr. | 99/425 |
| 3,231,718 | 1/1966 | Vasile | 99/422 |
| 3,245,462 | 4/1966 | Ramer | 165/39 |
| 3,733,027 | 5/1973 | Napier | 236/20 |
| 3,747,509 | 7/1973 | Hinkle | 99/422 |
| 4,586,428 | 5/1986 | Adamson | 99/322 |
| 4,607,609 | 8/1986 | Keating | 126/39 J |
| 4,724,823 | 2/1988 | Simpson | 126/39 R |
| 4,763,571 | 8/1988 | Bergling et al. | 99/349 |
| 5,227,597 | 7/1993 | Dickens et al. | 219/10.493 |
| 5,413,032 | 5/1995 | Bruno et al. | 99/422 |

FOREIGN PATENT DOCUMENTS 0197905 10/1986 European Pat. Off. ............ 99/422

*Primary Examiner*—Reginald Alexander
*Attorney, Agent, or Firm*—James A. Hudak

[57] ABSTRACT

A natural or LP gas-fired laminated griddle top structure providing an even distribution of heat over its cooking surface is disclosed. The griddle top includes an upper plate formed from a relatively thick iron or steel plate and a plurality of relatively thick lower plates formed from a dissimilar material having a high thermal conductivity. A thermal break is provided between adjacent lower plates and each lower plate has a channel provided therein for the receipt of a temperature sensing device. In addition, laterally extending grooves are provided in the bottom surface of the lower plates increasing the resulting heat transfer surface improving the thermal efficiency of the griddle top. One or more natural or LP gas-fired burners and associated controls are provided adjacent each lower plate permitting the entire cooking surface to be maintained at the same temperature or portions thereof to be maintained at different temperature, if desired.

9 Claims, 2 Drawing Sheets

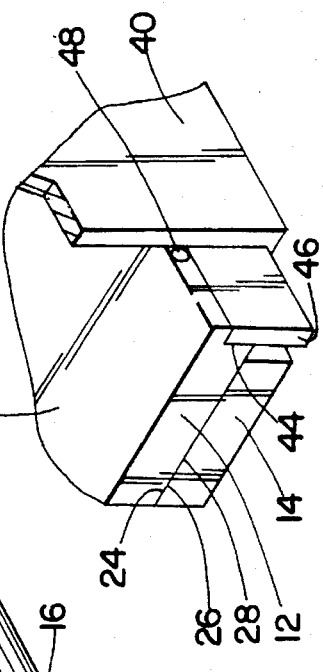
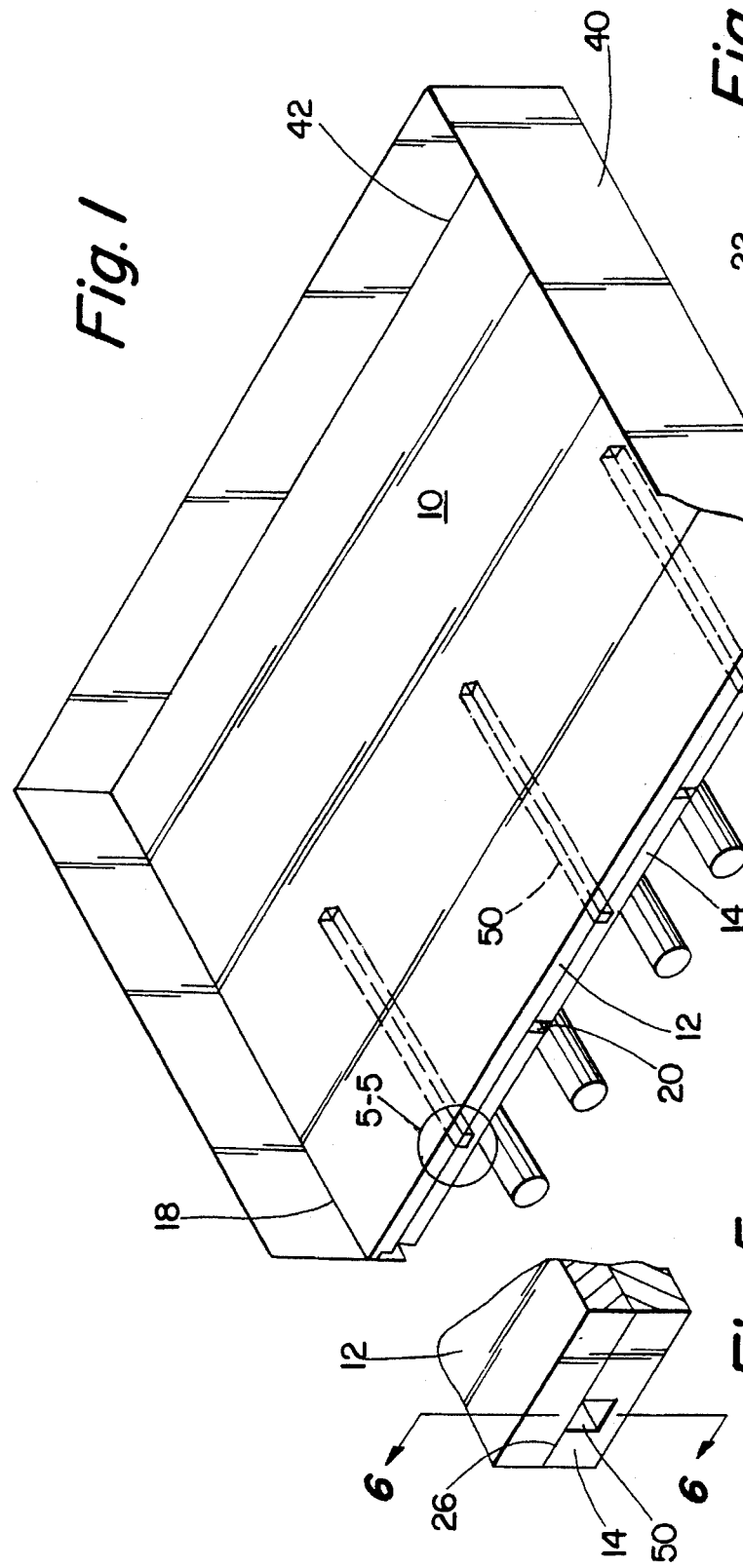
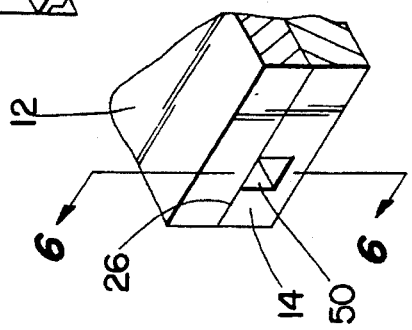

5,619,910

LAMINATED GRIDDLE TOP

TECHNICAL FIELD

The present invention relates, in general, to a griddle top construction and, more particularly, to a griddle top having a laminated construction for use in a natural or liquified petroleum (LP) gas-fired burner installation.

BACKGROUND ART

Griddle tops, such as those that are used for grilling foods, are typically electrically or gas heated and utilize a number of different types of constructions. Such griddle tops are usually fabricated from a steel or iron upper plate to provide a flat, durable and abrasion-resistant cooking surface. Because of the limited thermal conductivity of steel or iron, griddle tops typically provide a relatively even distribution of heat over the cooking surface only if the electrical or gas heating sources are positioned substantially evenly within or under the griddle tops. One type of griddle top construction uses a plurality of sub-plates or lower plates having cast-in electrical heating elements. The sub-plates are fabricated from a material that has a higher thermal conductivity than either steel or iron so as to more evenly distribute the heat from the electrical heating elements over the steel or iron upper plate. Additionally, the utilization of metal splash guards, typically attached by welding to the rear and side edges of a griddle top, results in the conduction of heat away from the edges of the upper plate, resulting in significantly lower cooking surface temperatures around the edges of the griddle top. Tests indicate that there is uneven distribution of heat over the cooking surface of presently available griddle tops, resulting in unevenly cooked foods and the possibility that harmful bacteriological contaminants within the food may not be thermally destroyed during the cooking process. Such tests also indicate that presently available gas heated griddle tops have a low thermal efficiency, typically less than 50%.

In view of the foregoing, it has become desirable to develop a griddle top that provides a substantially even distribution of heat over its cooking surface and wherein natural or LP gas-fired burners are utilized as the heat source.

SUMMARY OF THE INVENTION

The present invention solves the problems associated with the prior art gas heated griddle tops by providing a laminated griddle top structure comprised of an upper plate formed from a relatively thick iron or steel plate and a plurality of relatively thick sub-plates or lower plates formed from a dissimilar material having a high thermal conductivity, such as aluminum or the like. A thermal break is provided between the edges of each of the adjacent lower plates and thermally conductive mastic material is interposed between the bottom surface of the upper plate and the top surface of each of the lower plates. Additionally, the adjacent bottom and top surfaces of the upper plate and the lower plate, respectively, are ground substantially flat to further improve thermal conductivity. Each of the lower plates has a channel milled therein for the receipt of a thermostat bulb or other temperature sensing device and a plurality of grooves in the bottom surface thereof which increases the heat transfer surface resulting in a significant improvement in the thermal efficiency of the griddle top. One or more natural or LP gas-fired burners is provided below each of the lower plates and associated controls are also provided. The substantial thickness of the upper plate and each of the lower plates results in a significantly improved distribution of heat over the top surface of the upper plate. Also, if desired, since each of the lower plates may have a thermostat bulb or other temperature sensing device and one or more natural or LP gas-fired burners associated therewith, the temperature of each of the lower plates can be regulated so that a distinct temperature zone is maintained in the portion of the upper plate positioned directly above each lower plate. Additionally, means are provided in the form of a splash guard to thermally insulate the edges of the griddle top so as to improve temperature uniformity near the edges of the griddle top. Thus, the upper plate can be maintained at substantially the same temperature over its entire cooking surface or portions thereof can be maintained at different temperatures, if desired.

DESCRIPTION OF THE DRAWINGS

FIG. 1 is a perspective view of the laminated griddle top of the present invention.

FIG. 2 is an enlarged, partially sectioned, perspective view of a portion of the griddle top illustrated in FIG. 1.

FIG. 5 is another enlarged, partially sectioned, perspective view of the upper plate and lower plate utilized by the griddle top of the present invention illustrating the milled channel in a lower plate for the receipt of a thermostat bulb or temperature sensing device therein.

FIG. 6 is a cross-sectional view taken across section-indicating lines 6—6 of FIG. 5 and showing the milled channel in the lower plate and a thermostat bulb therein.

DESCRIPTION OF THE PREFERRED EMBODIMENT

Figure 4:
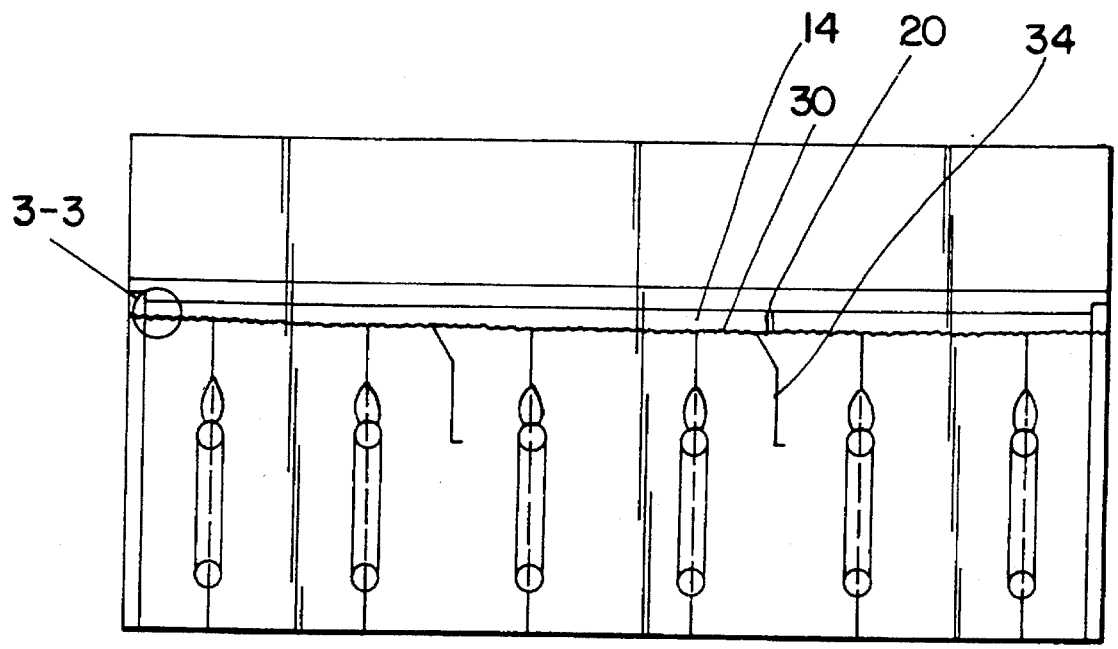
FIG. 4 is a front elevational view of the griddle top of the present invention.

Referring now to the drawings where the illustrations are for the purpose of describing the preferred embodiment of the present invention and are not intended to limit the invention described herein, FIG. 1 is a perspective view of the laminated griddle top 10 of the present invention. The griddle top 10 is usually rectangular or square in configuration and can be provided in various sizes. In a typical commercial cooking installation, the griddle top 10 will measure approximately 36 inches wide by 24 inches deep. Larger or smaller sizes of the griddle top 10 can be readily fabricated utilizing the concept of the present invention. The griddle top 10 can be placed within a cabinet or housing (not shown) or can be recessed upon or within a counter top so that the surface of the griddle top 10 is, in effect, at counter top height.

The griddle top 10 is comprised of an upper plate 12 and a plurality of sub-plates or lower plates 14 positioned so as to be substantially parallel to one another and having their laterally extending edges 16 substantially parallel to the laterally extending edges 18 of upper plate 12. The length of each lower plate 14 approximates the depth of the upper plate 12. A gap 20 is provided between the laterally extending edges 16 of adjacent lower plates 14 to provide a thermal break between adjacent lower plates 14.

Figure 3:
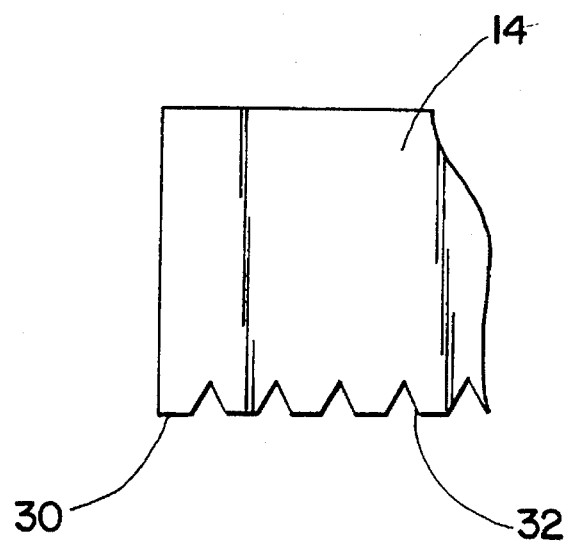
FIG. 3 is an enlarged, cross-sectional view of the lower plate utilized by the griddle top of the present invention.

Referring now to FIG. 2, an enlarged, partially sectioned, perspective view of a portion of the griddle top 10 is illustrated. Upper plate 12 is comprised of a relatively thick iron or steel plate. The top surface 22 of upper plate 12 may have some type of non-stick coating, plating or other treatment thereon to minimize the possibility of cooked food adhering thereto. Each of the sub-plates or lower plates 14 is formed from a relatively thick plate of aluminum or a similar material having a high thermal conductivity. The bottom surface 24 of the upper plate 12 and the top surface 26 of each of the lower plates 14 are ground substantially flat so that the top surface 26 of each lower plate 14 firmly contacts the bottom surface 24 of the upper plate 12 to improve thermal conductivity therebetween. Thermally conductive mastic material 28 is utilized between the bottom surface 24 of the upper plate 12 and the top surface 26 of each of the lower plates 14. The lower plates 14 are attached to the bottom surface 24 of upper plate 12 by fasteners (not shown). The bottom surface 30 of each of the lower plates 14 has a plurality of spaced-apart, laterally extending grooves 32 formed therein, as shown in FIG. 3. The grooves 32 can be of any configuration such as V-shaped (shown), rounded, curved, rectangular, etc. A laterally extending baffle 34 is attached to the bottom surface 30 of each lower plate 14 and is substantially aligned with the gap 20 between adjacent lower plates 14, as shown in FIG. 4. A splash guard 40 is positioned adjacent the laterally extending edges 18 and the rear edge 42 of the upper plate 12 and adjacent the outermost laterally extending edge 16 of the outermost lower plates 14 and adjacent the rear edge of each of the lower plates 14. A notched recess 44 is provided within the laterally extending edges 18 and the rear edge 42 of the upper plate 12. Thermal insulation 46 is placed within notched recess 44 and extends downwardly therefrom so as to be interposed between the inner surface of the splash guard 40 and the laterally extending edges 18 and the rear edge 42 of the upper plate 12 and between the inner surface of the splash guard 40 and the outermost laterally extending edge 16 of the outermost lower plates 14 and the rear edge of each of the lower plates 14. Additionally, an insulating sealant 48 may be provided adjacent the inner surface of splash guard 40 at its junction with the top surface 22 of upper plate 12. The utilization of thermal insulation 46 and insulating sealant 48 causes the splash guard 40 to be substantially thermally insulated from the upper plate 12 to reduce conduction of heat from the edges of the upper plate 12 to aid in maintaining a substantially even surface temperature adjacent the edges of the griddle plate 12. In addition, utilization of insulating sealant 48 prevents grease on the top surface 22 of upper plate 12 from passing between the laterally extending edges 18 of upper plate 12 and/or the rear edge 42 thereof to the burners and controls positioned under the griddle top 10.

Referring now to FIG. 5, which is another enlarged, partially sectioned, perspective view of the upper plate 12 and a lower plate 14, a blind milled channel 50 is provided in the approximate center of the top surface 26 of each of the lower plates 14. The channel 50 has a substantially square configuration and, if the lower plate 14 is formed from ¾ inch thick material, will typically have cross-sectional dimensions of approximately ½ inch by ½ inch. In addition, in a griddle top measuring approximately 36 inches wide by 24 inches deep, the channel 50 will have a depth of approximately 16 inches in the 24 inch direction, i.e., its depth will be at least ½ of the total depth of the griddle top. The channel 50 is positioned so as to be substantially parallel with the laterally extending edges 16 of lower plate 14 and with the gaps 20 which act as thermal breaks between adjacent lower plates 14. Referring now to FIG. 6 which is a cross-sectional view showing channel 50 and its relationship to the upper plate 12 and lower plate 14, a spring steel insert 52 having a plurality of convexly shaped upwardly directed curved portions 54 thereon is provided in each channel 50 adjacent the bottom surface 56 thereof. A temperature sensing bulb 58 is received within channel 50 and is positioned so as to contact the top surface of curved portions 54 of the insert 52 and the lower surface 24 of upper plate 12. In this manner, the temperature of the upper plate 12 adjacent the temperature sensing bulb 58 can be monitored and controlled.

Referring again to FIG. 1, a plurality of natural or LP blue flame gas-fired burners 60 are provided adjacent the bottom surface 30 of each lower plate 14 and are utilized to heat same which, in turn, causes the heating of the portion of upper plate 12 positioned directly thereabove. A temperature sensing bulb 58 within a lower plate 14 is connected to associated controls (not shown) which regulate the flow of gas to the natural or LP gas-fired burners positioned directly beneath the lower plate 14. In this manner, the temperature of each lower plate 14, and thus, the temperature of the portion of upper plate 12 positioned thereabove, can be monitored and controlled. Laboratory tests of the griddle top 10 of the present invention have shown that the griddle top 10 produces superior results with respect to minimizing temperature variation over the top surface 22 of the griddle top and/or eliminating "hot spots" or "cold spots" on the top surface 22 thereof. A typical commercially available griddle plate was used for comparison test purposes. In laboratory tests, at the end of griddle "heat up," the typical commercially available griddle plate exhibited a temperature difference over its top surface of up to 180° F. Utilizing the griddle top 10 of the present invention, at the end of griddle "heat up," the temperature variation over the top surface 22 of the griddle top 10 was less than 80° F. Similarly, at "idling" temperature the typical commercially available griddle top exhibited a temperature variation over the top surface thereof of up to 133° F. With the griddle top 10 of the present invention, such "idling" temperature variation over the top surface 22 thereof was reduced to 20° F. Since the griddle top 10 of the present invention reduces temperature variation over the top surface 22 thereof during "heat up" and at "idling," variations in cooking times and temperatures are substantially reduced. For example, with respect to the foregoing typical commercially available griddle top, the variation of the final temperature of hamburger patties exhibited a three standard deviation variation of ±16° F. Utilizing the griddle top 10 of the present invention, the variation of the final temperature of similar hamburger patties was reduced to a three standard deviation variation of ±5° F. In addition, since product cooking temperature is indicative of product "doneness," the griddle top 10 significantly increases thermal destruction of harmful bacteriological contaminants. Thus, the griddle top 10 of the present invention substantially reduces temperature variations over its cooking surface during both "heat up" and "idling" resulting in a more evenly heated cooking surface without "hot spots" or "cold spots" which, in turn, results in more evenly cooked foods and a substantial reduction in the standard deviation of final cooked product temperature. Additionally, the grooves 32 in the bottom surface 30 of the lower plates 14 increases the resulting heat transfer surface which significantly improves the thermal efficiency of the griddle top 10.

Even though the most important advantages of the present invention are that temperature variations over the cooking surface are minimized and "hot spots" and "cold spots" are eliminated, the top surface 22 of the upper plate 12 can be divided into separate temperature zones, if desired. Since each of the lower plates 14 has a temperature sensing bulb 58 and natural or LP gas-fired burners 60 associated therewith, the controls for each temperature sensing bulb 58 and its associated natural or LP gas-fired burner 60 can be utilized to regulate the temperature of the lower plate 14 positioned directly thereabove. In this manner, a separate temperature zone can be maintained in the portion of the upper plate 12 positioned directly above each lower plate 14. Since a gap 20 which acts as a thermal break is provided between adjacent lower plates 14 and a baffle 34 is utilized therebetween, the upper plate 12 can be divided into as many temperature zones as there are lower plates 14 because the temperature of each lower plate 14 can be regulated. Thus, the upper plate 12 can be maintained at substantially the same temperature over its entire cooking surface or portions thereof can be maintained at different temperatures, if desired.

Certain modifications and improvements will occur to those skilled in the art upon reading the foregoing. It should be understood that all such modifications and improvements have been deleted herein for the sake of conciseness and readability, but are properly within the scope of the following claims.

I claim:

1. A griddle top structure comprising an upper plate formed from a substantially heavy gauge ferrous material, a plurality of lower plates each formed from a substantially heavy gauge material dissimilar from the material comprising said upper plate and having a substantially high thermal conductivity, said plurality of lower plates being operatively attached to said upper plate and arranged in a side by side relationship so as to be substantially parallel to one another with a gap between the edges of adjacent lower plates, at least one of said lower plates within said plurality of lower plates having a channel formed therein, said channel being positioned adjacent the upper surface of said at least one of said lower plates within said plurality of lower plates, a temperature sensing device received within said channel within said at least one of said lower plates within said plurality of lower plates, means for biasing said temperature sensing device within said channel against the lower surface of said upper plate, and at least one gas-fired burner positioned in a spaced-apart relationship with respect to said plurality of lower plates.

2. The apparatus as defined in claim 1 further including a guard member positioned adjacent the periphery of said upper plate.

3. The apparatus as defined in claim 2 wherein said guard member is also positioned adjacent the periphery of each of the outer most lower plates within said plurality of lower plates.

4. The apparatus as defined in claim 2 further including thermal insulation means interposed between the inner surface of said guard member and the outer edge of said upper plate.

5. The apparatus as defined in claim 3 further including thermal insulation means interposed between the inner surface of said guard member and the outer edge of at least one of the outer most lower plates within said plurality of lower plates.

6. The apparatus as defined in claim 1 wherein at least one of said lower plates within said plurality of lower plates has at least one laterally extending groove formed therein.

7. The apparatus as defined in claim 6 wherein said laterally extending groove is provided within the lower surface of said at least one of said lower plates within said plurality of lower plates.

8. The apparatus as defined in claim 1 further including a laterally extending planar baffle member attached to the bottom surface of each of said plurality of lower plates.

9. The apparatus as defined in claim 8 wherein said laterally extending planar baffle member is positioned so as to be substantially aligned with said gap between said adjacent lower plates.

* * * * *